United States Patent [19]

Leonard, Jr.

[11] 4,131,302
[45] Dec. 26, 1978

[54] CLAMP-WELDED PIPE JOINT

[75] Inventor: Byron H. Leonard, Jr., Atherton, Calif.

[73] Assignee: Bechtel International Corporation, San Francisco, Calif.

[21] Appl. No.: 829,696

[22] Filed: Sep. 1, 1977

Related U.S. Application Data

[62] Division of Ser. No. 695,605, Jun. 14, 1976, Pat. No. 4,065,846.

[51] Int. Cl.$^2$ ............................................. F16L 13/04
[52] U.S. Cl. .................................. 285/114; 285/286; 285/367; 228/139; 228/168
[58] Field of Search ............... 285/286, 367, 114, 411; 403/271, 266, 338; 29/407, 401 R, 426; 228/104, 119, 138, 139, 168

[56] References Cited

U.S. PATENT DOCUMENTS

| | | | |
|---|---|---|---|
| 1,246,091 | 11/1917 | Haller | 285/286 |
| 1,771,739 | 7/1930 | Wise | 285/286 |
| 3,180,714 | 4/1965 | Kremer et al. | 228/212 X |
| 3,406,444 | 10/1968 | Parker et al. | 228/218 X |
| 4,065,846 | 1/1978 | Leonard | 403/338 |

FOREIGN PATENT DOCUMENTS

| | | | |
|---|---|---|---|
| 435132 | 9/1935 | United Kingdom | 285/286 |
| 477476 | 12/1937 | United Kingdom | 285/286 |

*Primary Examiner*—Dave W. Arola
*Attorney, Agent, or Firm*—Townsend and Townsend

[57] ABSTRACT

A seal-welded pipe joint mechanically braced by a clamp for preferred use in handling toxic and radioactive materials is disclosed together with a process for joining the same. The joint comprises a pair of abutted male frustroconical skirts, each attached integrally to the pipe segments to be joined and confronting each other at opposed mating and finished surfaces which define a sunken ridge at their periphery. A uniform continuous seal weld of relatively slight penetration seals the opposed mating and finished surfaces at the ridge. The pipe joint is physically secured by a plurality of, for example, three female frustroconical segments forming a circumscribing collet which is circumferentially clamped to the skirt by a plurality of, for example, three tangentially disposed bolts. The abutted frustroconical skirts taper from a broad cross section adjacent the pipe wall radially outwardly to a narrower cross section. The sunken seal welded ridge is at the peripheral margin of the abutting surfaces and is set off by annular channels around the periphery of the abutted skirts. Collet segments define an inside annular concavity which fit over and receive the abutted frustroconical skirts. Complementary to the frustroconical skirts, the inside annular concavity of the collet tapers from a broad cross section at the margin nearest the pipe wall radially outwardly to a narrow cross section. When the collet is clamped over the abutted skirts with seal weld there between, the mating and finished surfaces are compressed together, relieving the seal weld of shearing and normal stresses. The joining process includes the critical step of uniformly compressing the mating and finished surfaces together before seal welding at the ridge. A preferred embodiment of this compressing step includes drawing a vacuum within or evacuating the mated pipe segments to maintain intimate and uniform contact between the pipe segments at the finished and mated surfaces during seal welding and the following installation of the collet. The compression is released only after the weld has been checked for leaks and the collet tightened. Servicing of the joint by automatic cutting and welding equipment is set forth.

2 Claims, 12 Drawing Figures

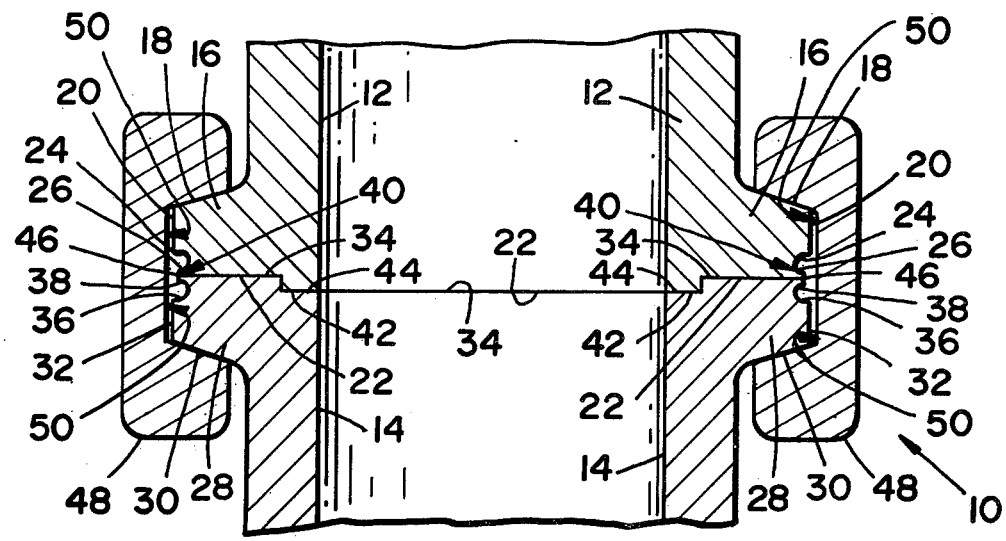
FIG_1
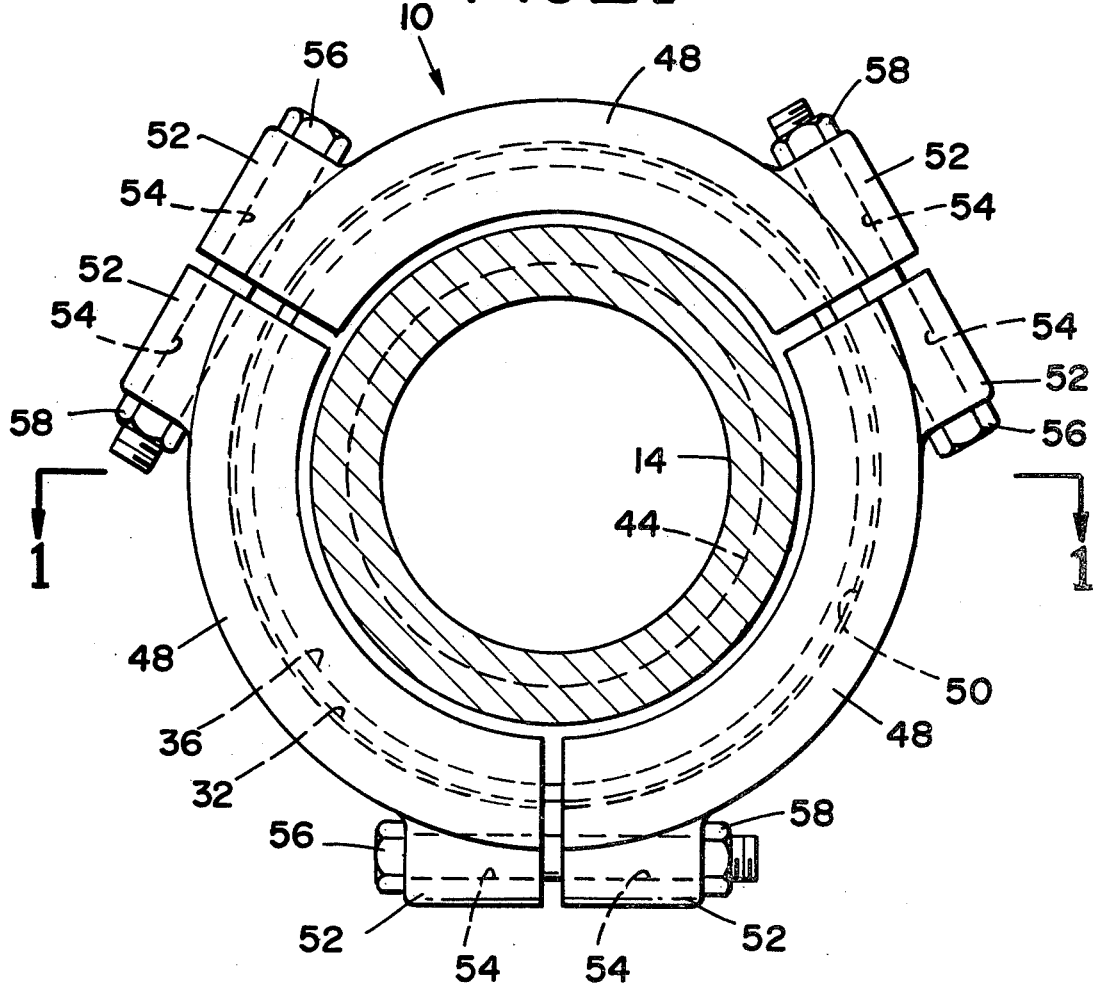
FIG_2

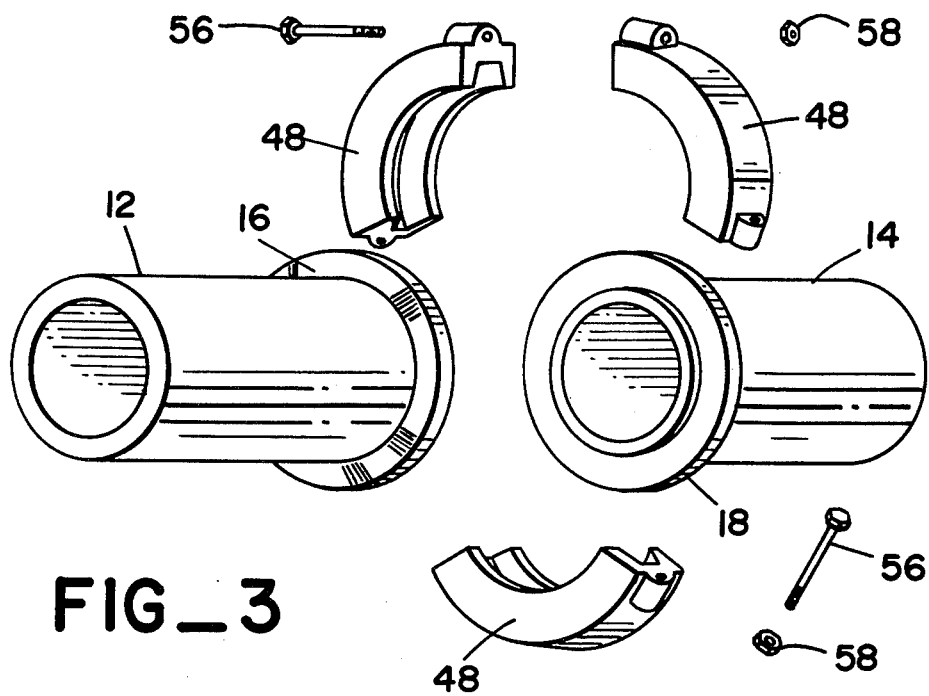
FIG_3
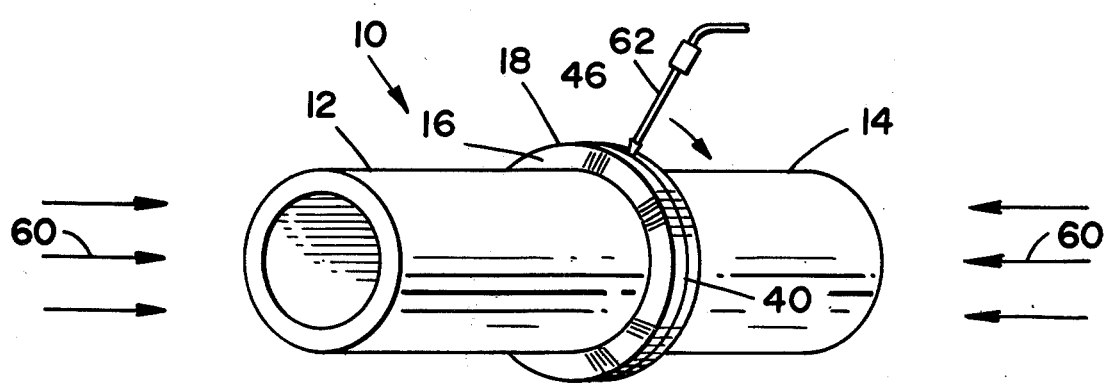
FIG_4
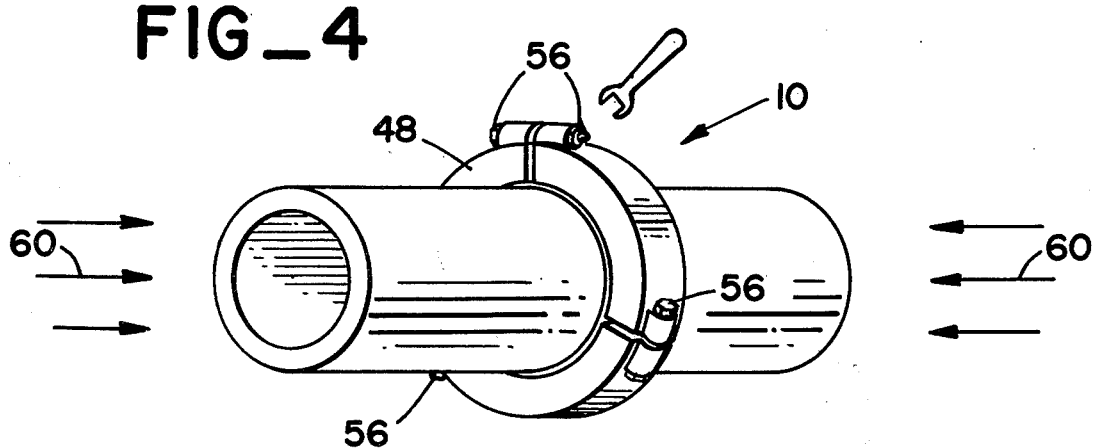
FIG_5

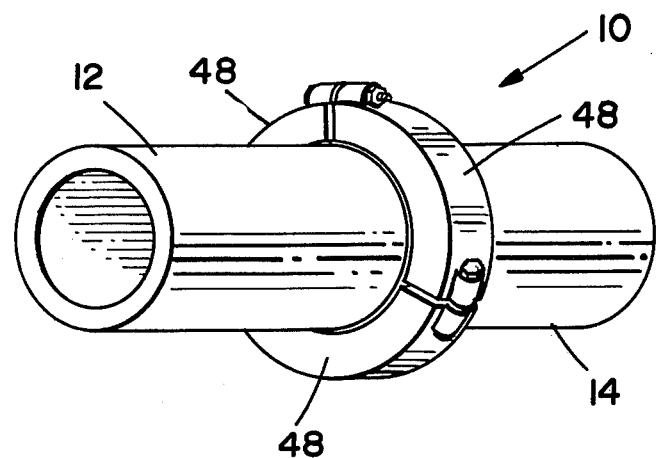
FIG_6
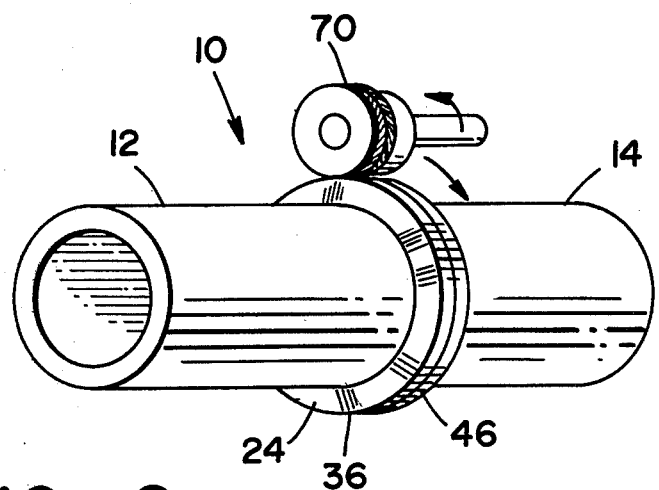
FIG_9
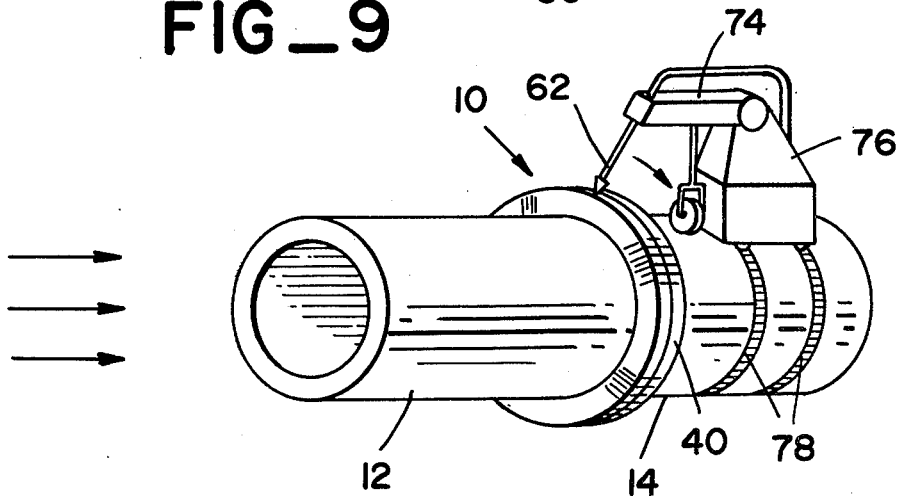
FIG_10

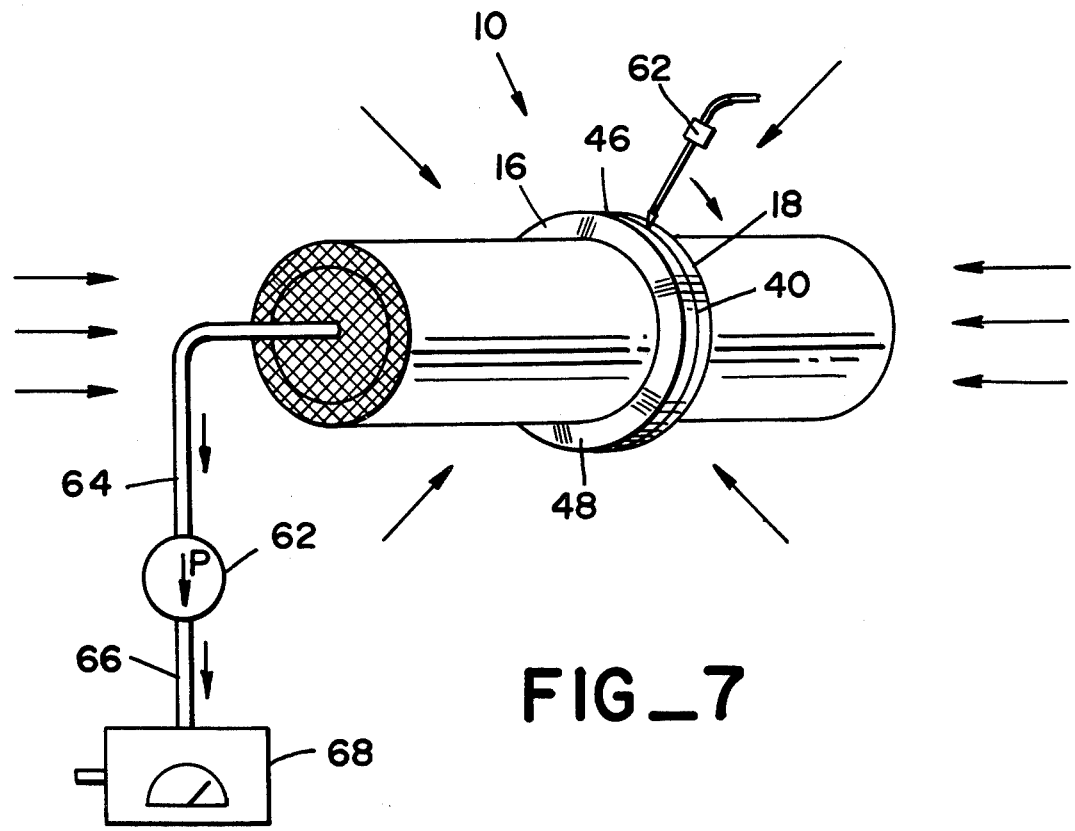
FIG_7
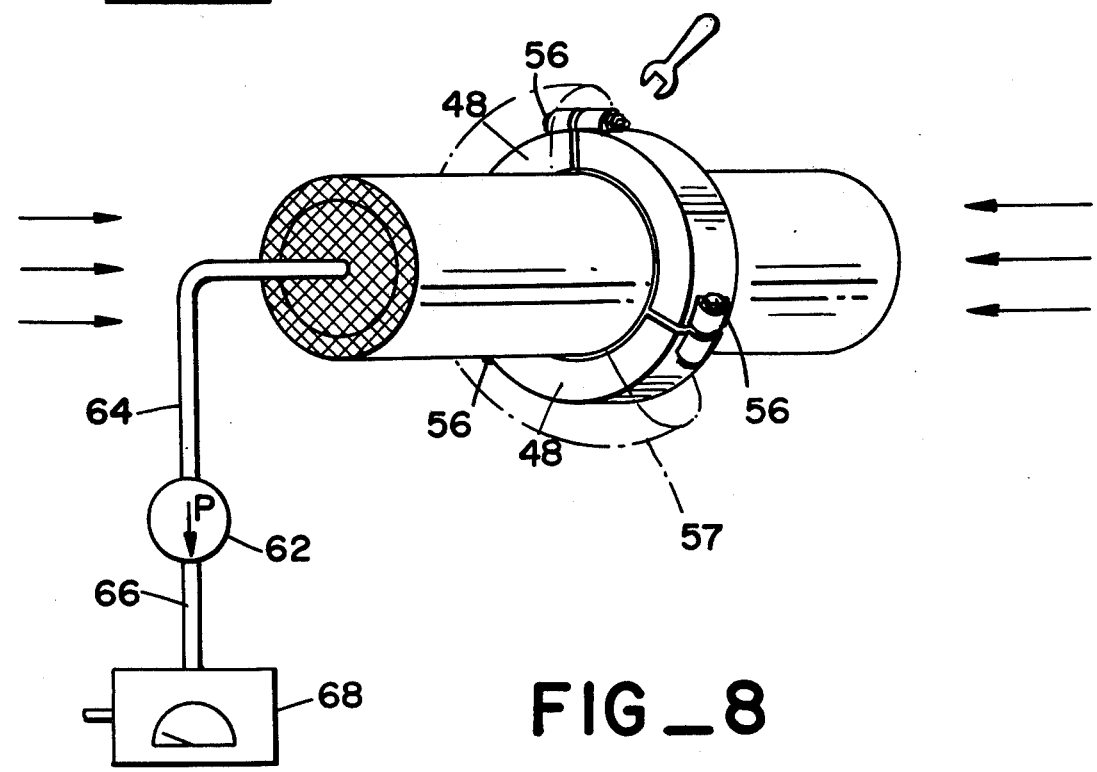
FIG_8

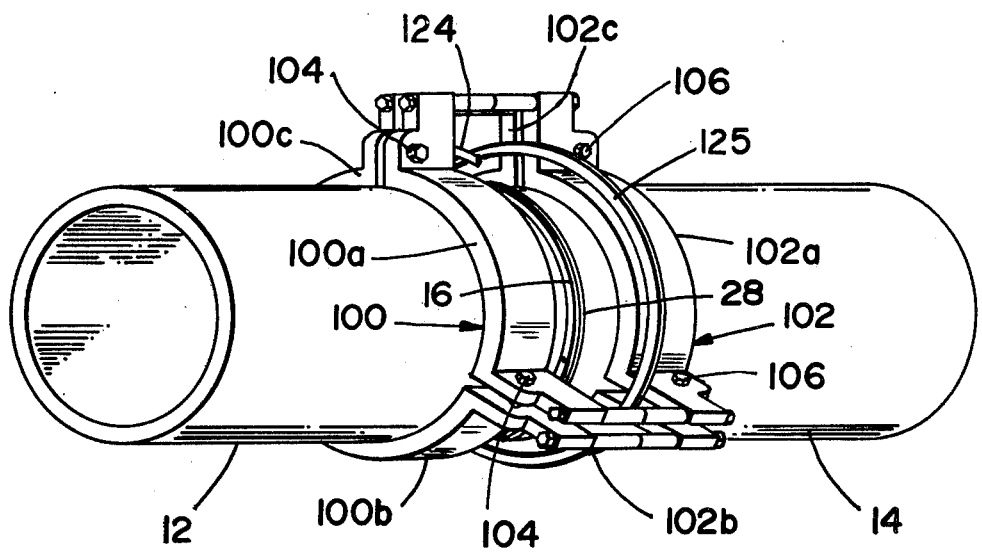
FIG _ 11
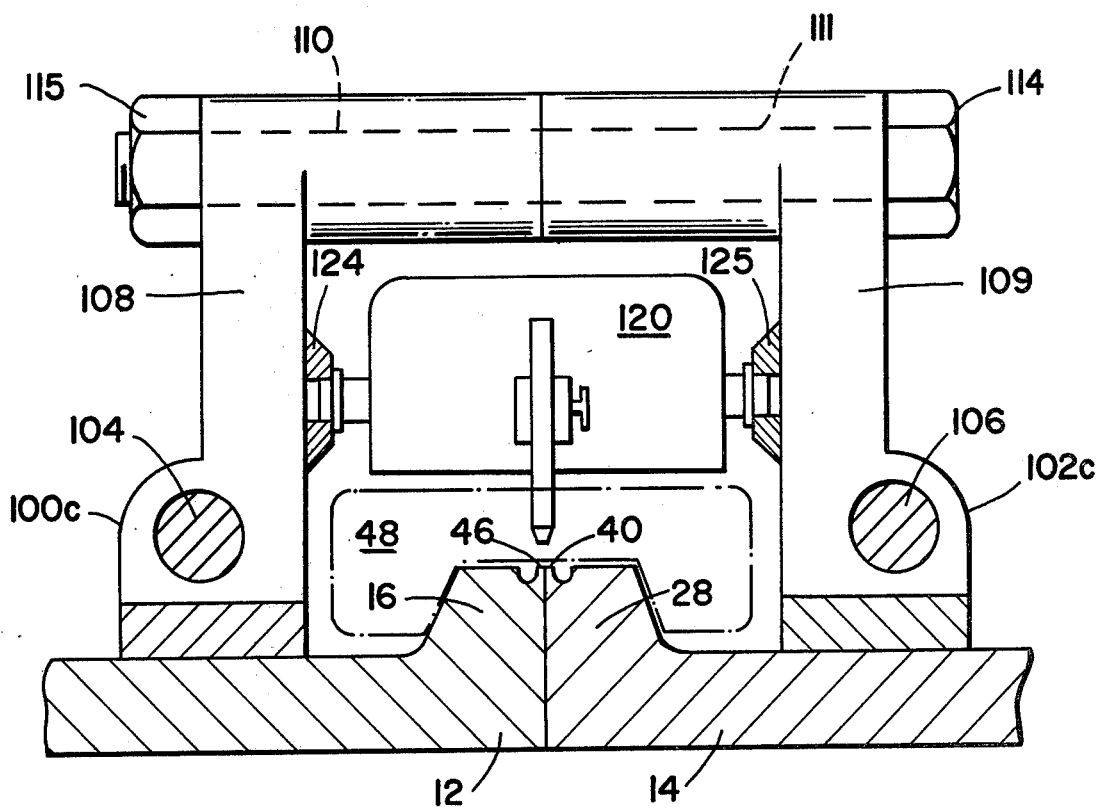
FIG _ 12

CLAMP-WELDED PIPE JOINT

This is a Division of application Serial No. 695,605, filed June 14, 1976, now Patent No. 4,065,846.

FIELD OF THE INVENTION

This invention relates to seal-welded pipe joints. More particularly, a seal-welded pipe joint is disclosed in combination with a circumferentially clamped collet. A process of assembly making possible the collet and seal weld combination is set forth.

BACKGROUND OF THE INVENTION

In the pressurized toxic and radioactive environment of the nuclear power plant, pipe joints having absolutely fluid-tight seals are required. Moreover, the joints must be of sufficient strength that their flexure does not cause their seals to leak.

The same requirements for seal welded pipe joints are found in many other conventional piping applications. Moreover, a need exists for easily serviced seal weld pipe joints.

SUMMARY OF THE PRIOR ART

In the prior art, seal-welded pipe joints are known which include mated flanges seal-welded along the mating edges, usually at a ridge. The mated flanges are physically secured by paired rings, one over each flange. These rings engage the flanges and urge the flanges one toward another by axially disposed bolts between the rings. One such joint is described in U.S. Patent 1,771,739. Typically, the joints to be seal-welded are first clamped together by the axial bolts acting through the rings. The bolts and rings together apply "end pressure"; that is, axially directed pressure compressing the joint together. A group of bolts is then removed to expose a segment of the joined pipe flanges for weld. Weld occurs at the exposed segment. The removed bolts are then replaced, adjacent bolts removed, and the process repeated.

When the bolts are removed over the segment to be welded, the "end pressure" is partially removed resulting in non-uniform compression on the joint. Thermal expansion occurring during welding induces further uneven "end pressure" around the joined flanges. To withstand these pressure changes, it is often required that the seal weld be given penetration into the flanges to provide a mechanical strength function to the weld, as well as a sealing function to the weld. Finally, when bolts are replaced, non-uniform tightening of axially aligned bolts may weaken the joint by providing non-uniform stress on the seal weld. No provision is made in such joints for a continuous seal weld around the entire periphery.

Other disadvantages of such paired ring secured joints with axially aligned bolts include the fact that the opposed rings and their bolt path must extend radially outward beyond and over the seal weld. Further, the distance between the opposed rings must be such that sufficient room is left for access for welding apparatus to penetrate between the rings in the area of the removed bolts. As a result of both the required bolt path and the spatial separation for the welding apparatus, such prior art seal-welded joints are large, heavy, and therefore must be relatively cumbersome to obtain their required physical strength. The seal welds of such a cumbersome joint can and do crack and/or leak.

Pipe couplings are known which have circumferentially clamped collets; that is, discrete sections which together circumscribe a pipe joint. Each of these sections has an inner female frustroconical annular concavity for mating with the outer male frustroconical skirts of confronting pipe joint flanges. U.S. Patents 3,794,361 and 3,544,138 are but two examples of pipe joints utilizing circumferentially tightened collets. Such pipe joints, however, generally include and require O-ring sealing rings or the like. Seal welds have heretofore not been used with such collets. This is because a circumferentially tightened collet almost completely covers the joint, preventing access to the joint by welding apparatus.

SUMMARY OF THE INVENTION

A seal-welded pipe joint mechanically braced by a clamp for preferred use in handling toxic and radioactive materials is disclosed together with a process for joining the same. The joint comprises a pair of abutted male frustroconical skirts, each attached integrally to the pipe segments to be joined and confronting each other at opposed mating and finished surfaces which define a sunken ridge at their periphery. A uniform continuous seal weld of relatively slight penetration seals the opposed mating and finished surfaces at the ridge. The pipe joint is physically secured by preferably three circumscribing female frustroconical segments forming a collet which is circumferentially clamped to the skirt by a plurality of, for example, three tangentially disposed bolts. The abutted frustroconical skirts taper radially outwardly from a large cross section to a smaller cross section. The recessed seal welded ridge is at the abutting peripheral margin there between, and is set off by annular channels around the periphery of the abutted skirts.

The collet segments define an inside annular concavity which fits over and receives the abutted frustroconical skirts. Complementary to the frustroconical skirts, the inside annular concavity of the collet tapers radially outward from a large cross section nearest the pipe wall to a small cross section remote from the pipe wall. When the collet is at its discrete sections circumferentially clamped over the abutted skirts with seal weld there between, the mating and finished surfaces are compressed together, relieving the seal weld of shearing and normal stresses. The joining process includes the critical step of uniformly compressing the mating and finished surfaces together before the seal welding at the ridge. A preferred embodiment of this compressing step includes pulling a vacuum within or evacuating the mated pipe segments to maintain intimate and uniform contact between the pipe segments at the finished and mated surfaces during seal welding and the following installation of the collet. The compression is released only after the weld has been checked for leaks and the collet tightened. Servicing of the joint by automatic cutting and welding equipment is set forth.

OBJECTS AND ADVANTAGES OF THE INVENTION

An object of this invention is to disclose a seal-welded pipe joint utilizing a circumferentially clamped collet. Abutted frustroconical skirts are compressed and seal-welded at a ridge between the skirts. A collet having an inside annular concavity which fits over, circumscribes, and receives the abutted frustroconical skirt is clamped about the skirts immediately over the seal weld.

An advantage of the disclosed pipe joint is that a circumferentially clamped collet can be used in combination with a seal weld. A dimensionally small and low mass pipe joint with high physical strength and integrity results.

A further advantage of the pipe joint of this invention is that the seal weld may consist of a single uniform weld over a minimal area at an exposed mating ridge between frustroconical surfaces. This seal weld may have relatively slight penetration. Further, the seal weld is subject to a minimum of mechanical stresses imposed upon it during joint assembly and subsequent use as installed. For example, the circumscribing, circumferentially clamped collet can be tightened without danger of weld buckling.

Yet another advantage of this pipe joint is that the circumferentially clamped collet imparts to the joint the mechanical strength required. This mechanical strength is substantially independent of any strength derived from the seal weld.

Yet a further advantage of the collet circumferentially clamping frustroconical flanges is that the collet segments can be fastened with a minimum of tangentially disposed clamping bolts. Moreover, these bolts need not be tightened uniformly. The tangential alignment assures that each bolt is substantially under the same tension.

Yet another advantage of the seal weld-collet combination is that the seal weld can be placed immediately adjacent the collet concavity. It is not required to be separated by a substantial distance from the collet such as that required to provide access for welding apparatus. A radially smaller joint results.

A further advantage of the collet in combination with the frustroconical skirts is that expansion of the joint in use only serves to tighten and render more secure the resultant joint. The collet serves the purpose of providing a mechanically induced shrink fit over the seal-welded skirts.

Still another advantage of the collet in combination with the skirts is that where the joint is used at elevated temperatures, the joint becomes more secured when heated. Typically, the joint is heated and the skirts expand. The collet, being radially outward, remains at a cooler and more contracted disposition. Thus, as the joint heats, the integrity of the shrink fit increases with the collet clamping the skirt with increasing force.

Yet another advantage of the collet and skirt combination is that the resultant joint uses less material and has a higher strength to weight ratio than known prior art seal-welded joints.

Another object of this invention is to disclose a process of joining a seal-welded joint which is held together with a circumferentially clamped collet. According to this aspect of the invention, the joining process includes the critical step of compressing the mated and finished surfaces of the frustroconical skirts together before seal welding at the ridge occurs. Thereafter and preferably, a continuous seal weld of minimum penetration is made at the ridge about the joint. When the weld is completed, the collet is circumferentially clamped to apply axial compression on the two abutted skirts. Then and only then is the compression on the skirts relieved with the clamped collet taking over the compressive function at the confronted skirts by wedging the skirts one towards another.

An advantage of this sealing process is that it enables a circumferentially clamped collet to be used for the first time with a mere seal weld.

A further advantage of this process is that minimum thermal stressing of the joint occurs due to heat imparted by the welding process as well as contraction of the placed weldment, since a seal weld of minimum penetration may be used.

A further advantage of this welding process is that seal welds are not required to be placed about the joint in segments. Thermal stressing due to sequential welding of a segment, cooling of the segment, and welding of adjacent segments is avoided.

Still another advantage is the placement of the seal weld being made during constant compression of the abutted skirts. There is no requirement to change the end pressure over segments of the joint during joint assembly. Consequently, a seal weld of minimum penetration may be used.

Still another advantage of the clamping collet utilized in the process of joint assembly is that uneven pressure is not generated at the confronted skirts. An even pressure gradient is applied over the entirety of the joint.

Yet another advantage of the use of the circumferentially clamped collet in the process of assembly is that bolt alignment or ring rotation with the disclosed joint are not sources of difficulty. As axially aligned bolts are avoided and tangentially aligned bolts used, rotational alignment of rings with mating holes is not required. Moreover, torquing of axially extending bolts and careful measurement of their compressive pressure with torque wrenches and the like is avoided.

Still another object of this invention is to disclose a preferred process of providing a critical compression to the abutted frustroconical skirts before seal-welding at the ridge occurs. According to this aspect, skirts are abutted at their mating and finished surfaces. Thereafter, the interior of the two pipes to be joined at the pipe joint is evacuated or placed under a vacuum. Compression due to the ambient atmospheric forces inwardly to the vacuum occurs. This pressure is uniform and constant.

An advantage of this vacuum compression step is that the pipe joints may be conveniently held together without a jig or clamp applying end pressure on the joint during seal welding. This holding allows placement of the seal weld and subsequent placement of the collet to occur all without the presence of independent jigs or clamps applying end pressure.

A further advantage of this vacuum compression step is that the vacuum produces a serendipitous result. It may be used to test the leak integrity of the joint in conjunction with conventional gas detection apparatus such as halide or helium leak detectors and the like.

An advantage of both the joint and the process of assembly is that the resultant joint may easily be serviced after installation. As hereinafter disclosed, when it is required to ultimately disassemble the joint, the joint may be remotely cut and remachined at the site of the seal weld ridge. This cutting and remachining removes the seal weld and prepares the ridge for rewelding or required reassembly of the pipe joint in the event that is desired.

A further object of this invention is to disclose a jig for automatically installing the joint of this invention. According to this aspect of the invention, pipe segments are clamped adjacent their frustroconical skirts by opposed jigs. Each jig is frictionally clamped to the pipe.

A plurality of bolts can apply end pressure between the opposed jigs to uniformly compress the mating and finished surfaces together and to form the recessed ridge. Alternately, a vacuum can be drawn to apply end pressure. Each jig defines one circumscribing track for a welding pantograph. The pantograph can thus be installed and travel around the recessed ridge to remotely effect a seal weld. Once the seal weld is completed, the collet is fastened in place with the opposed jigs still applying end pressure. When the collet is in place and firmly fastened to substitute its own end pressure for the end pressure previously supplied by the jigs, the jigs are removed.

An advantage of this apparatus is that the process of installing the seal-welded joint can be largely automated.

BRIEF DESCRIPTION OF THE DRAWINGS

Other objects, features and advantages of this invention will become more apparent after referring to the following specification and attached drawings in which:

FIG. 1 is a cross-sectional view of a pipe joint according to this invention;

FIG. 2 is an axial section of the pipe joint of FIG. 1 illustrating the circumscribing, circumferentially clamped collet;

FIG. 3 is an exploded perspective view of a clamp-welded pipe joint prior to assembly;

FIG. 4 depicts the welding step according to this invention;

FIG. 5 depicts the final assembly step according to this invention;

FIG. 6 is a perspective view of the assembled joint;

FIG. 7 depicts the preferred embodiment of the assembly process showing combined seal welding and testing steps;

FIG. 8 depicts the preferred embodiment of the method showing combined final assembly and testing steps;

FIG. 9 depicts a disassembly step showing the removal of the seal weld and preparation of the joint for reassembly;

FIG. 10 depicts an apparatus suitable for use with welding and cutting tools for automatic application of the seal weld and for automatic removal of the seal weld in preparation for reassembly according to the present invention;

FIG. 11 is a perspective view of an apparatus including opposed jigs for automating the installation of a seal weld and permitting the installation of a collet over the weld while end pressure is continuously supplied to the pipe joint by the opposed jigs; and, FIG. 12 is a section of the apparatus of FIG. 11 taken at lines 12—12 of FIG. 11.

DETAILED DESCRIPTION OF THE PREFERRED EMBODIMENTS

First described is the structure of the pipe joint according to the present invention. Thereafter will be described the method and apparatus for constructing the pipe joint.

Referring to FIG. 1, a pipe joint referred to generally as 10 comprises a first pipe segment 12 and a second nearly identical pipe segment 14. Integrally formed to the first pipe segment 12 is a male frustroconical skirt 16. Skirt 16 has an outer surface 18 and a machined surface 22. Skirt 16 tapers from a relatively broad cross section between surfaces 18 and 22 adjacent the pipe segment 12 to a narrower cross section at its periphery 20 remote from pipe segment 12. The skirt 16 includes a first surface 22 machined smooth for mating an abutting surface. An annular groove 24 is provided in the periphery 20 proximate to and entirely around the outer edge of the machined surface 22. The edge of this annular groove 24 defines a first narrow annular ridge 26 on pipe segment 12. This ridge is recessed with respect to the surface of the periphery 20.

The second pipe segment 14 includes similar features. A male frustroconical skirt 28 is integrally formed with the pipe segment 14 and includes a tapered outer surface 30 which terminates in a periphery 32. A second machined surface 34 is adapted to mate with the first machined surface 22. An annular groove 36 is similarly provided circumscribing the outer edge of the second machined surface 34. This groove 36 defines a second annular ridge 38 recessed with respect to the surface of periphery 32.

It should be understood that skirts 16 and 28 can be joined to pipe segments 12 and 14 in any number of ways. For example, flaring of the pipe segment ends, welding, or the like could be used in place of the integral formation here shown.

The preferred method of flange or skirt installation is to weld two loose flanges or skirts with butt welds to effect integral attachment of pipe segments 12, 14 and skirts 16, 28 respectively. This weld is not shown as it is well known in the prior art.

Pipe segments 12 and 14 are joined by bringing the machined surfaces 22 and 34 into abutment. Annular ridges 26 and 38 mate to define a combined recessed ridge 40. To aid in proper alignment and to impart mechanical strength (especially in shear), the machined surface 22 may preferably be provided with an annular protrusion 42 which mates with an annular recess 44 in machined surface 34.

The recessed ridge 40 is provided with a seal weld 46 to seal the joint. Preferably the bead of the seal weld 46 is continuously laid.

It is apparent that the ridge 40 is not the only configuration which would accept a seal weld. For example, a machined "V" surface could likewise accept a seal weld. Thus the term "ridge" as used herein is intended to cover any interface between the skirts which will accept a seal weld.

A collet 48 comprising a plurality of arcuate segments defines an inside annular concavity 50 exposed radially inward to pipe joint 10. This concavity 50 is shown in FIG. 1 occupied by frustroconical skirts 16 and 28.

The concavity 50 is complementary to the skirts 16 and 28; the collet fits over and conforms in intimate mating engagement with surface 30 on skirt 28 and surface 18 on skirt 16. The collet 48 fits over the seal weld 46 and receives the abutted skirts 16 and 28. In the engaged position, each segment of the collet 48 spans both skirts 16 and 28.

Referring to FIG. 2, preferably three discrete segments together form the circumscribing collet 48. Each discrete segment of collet 48 includes lugs 52 with bores 54 for receiving tangential clamping bolts 56 secured by nuts 58. The bores 54 are disposed tangentially to the axis of the joined pipe segments.

Because the bolts 56 are tangentially aligned, when the collet 48 engages the abutted skirts 16 and 28 and the bolts 56 are tightened, the mating and finished surfaces 22 and 42 on one side, and 34 and 44 on the other side are uniformly compressed together, thereby substantially relieving the seal weld 46 of all shearing and normal stresses.

The joining and welding process associated with the pipe joint according to the invention are depicted in the subsequent figures.

In FIG. 3 the disassembled joint is shown with the associated collet 48 segments and hardware. In the preferred embodiment utilizing three collet 48 segments, only three clamping bolts 56 and nuts 58 are required.

In the assembly process, the mating segments 12 and 14 are brought into abutment in preparation for receiving a seal weld (FIG. 4). According to the invention, uniform "end pressure" (see vectors 60 in FIG. 4) is applied to compress the joined segments throughout the assembly. This axial compression is maintained at least substantially uniform until the completion of the assembly process. It will be explained hereafter that this axial compression to the pipe can be applied by either drawing a vacuum or by applying mechanical compression or end pressure to the joint. The maintenance of this "end pressure" or axial compression is critical to the assembly of a sound joint.

While "end pressure" is maintained, a continuous seal weld 46 bead is laid along the crown of the ridge 40 by a suitable welder 62. A uniform and continuous bead laid under uniform continuous "end pressure" assures the integrity of the seal even though the penetration of a seal weld is typically slight.

While the uniform compression schematically shown at vectors 60 is still maintained as depicted in FIG. 5, the collet 48 segments are fitted over the skirts and the tangentially disposed bolts 56 are tightened.

Once the collet segments 48 are in place, the external compression is released (FIG. 6). The pipe joint 10 is thus assembled and ready for use in operation.

The forces exerted by the collet can be understood. First, there is an axial force on the skirts 16 and 28 which maintains the axial or end pressure on the mating surfaces. Second, a residual force radially compressing the joint at the skirts results.

The uniform end pressure provided during the assembly process may be maintained by any variety of means. For example, and as will hereinafter be illustrated, the end pressure may be provided by a brace or the like which compresses the pipe segments together, holding them in uniform intimate contact throughout the assembly process.

A preferred embodiment of the compressing step depicted in FIGS. 7 and 8 is the evacuating or drawing of a vacuum within the interior of the abutting pipe segments to maintain uniform and intimate contact during the assembly process. The vacuum, and thereby the compression, is relieved only after the collet 48 has been tightened and the seal weld checked for a complete and absolute seal.

Referring to FIG. 7, the joint 10 is first prepared for evacuation by bringing the pipe segments into abutment and plugging the interior of the pipe in any suitable manner to provide a chamber within the joint. A vacuum pump 62 is coupled to the interior of the joint 10 by a suitable eductor line 64. A vacuum is drawn on the interior of the joint 10, at least partially evacuating it and compressing the finished surfaces 22, 42 and 34, 44 against one another (see FIG. 1). While the vacuum is maintained, a continuous seal weld bead is laid along the crown of the sunken ridge 40 to seal the interior of the joint 10.

Referring to FIG. 8, the collet 48 is attached and the bolts 56 tightened while the pump 62 maintains a vacuum. The compression is released after the assembly operation has been completed.

Maintaining joint compression by means of a vacuum pump according to the preferred method has an added advantage over the prior art. In particular, assembly and testing may be combined into one step. The vacuum pump 62 may be provided with an eductor outlet 66 which couples the exhaust of the vacuum pump 62 to a conventional leak detector 68. When the welding process is complete and while the vacuum is maintained, the integrity of the seal weld may be tested with the leak detector 68 by examination of the exhaust from the vacuum pump 62. For this purpose a suitable test gas such as helium of a halide may be introduced locally to and immediately external of the pipe joint at the seal weld under a circumscribing, substantially gas-tight shroud 57. If a leak exists at the seal weld, the test gas will be drawn to the vacuum and into the vacuum producing pump 62. The presence of the gas inside the pipe segments can be detected by a conventional leak detector 68. This arrangement permits the pipe joint to be tested during assembly and, if necessary, repaired.

The pipe joint according to the invention may be easily disassembled for maintenance. FIG. 9 shows the pipe joint after removal of its collet (required physical supports being omitted for convenience). The seal weld 46 may be removed by an appropriate cutting tool as here shown; a cutting tool 70 may include a milling cutter with a specially shaped head. The head may be shaped to trim off the seal weld 46 and dress the annular grooves 24 and 36 in one motion. In particular, the milling cutter may have the precise profile of the grooves 24 and 36 and the conjoined ridge 40 (see FIG. 1) prior to the laying of a seal weld.

FIG. 10 depicts apparatus for automatic severing or welding of the pipe joint 10 which may be suitable for use in conjunction with the vacuum pump 62. The apparatus comprises a jig 74 operable to receive and to carry the welding tool 62 in a position adjacent the site of the seal weld. In addition, the same jig 74 may be operable to receive and to carry a milling cutter in a position for trimming and dressing the pipe joint 10. The jig 74 may be supportably attached to a transport mechanism or vehicle 76. The vehicle 76 may ride on chain track guides 78 which are wrapped around at least one pipe segment parallel to the junction of the pipe segments 12 and 14. The vehicle 76 may be operable to continuously follow the tracks 78 around the complete periphery of the pipe joint to carry the jig 74 at a uniform speed and separation from the pipe joint. With the jig 74 carrying a welding head, a uniform continuous seal weld bead may thereby be readily applied to the crown of the ridge 40. With the jig 74 carrying the cutting tool, the site of the seal weld may be thereby trimmed and dressed for subsequent reassembly.

The joint 10 and process of assembly incorporate a number of further advantages over the prior art. For example, the annular grooves 24 and 36 setting off the ridge 40 cooperate with the uniformly applied end pressure to aid in the provision of a uniform seal weld. The grooves 24 and 36 provide a relatively small area for forming the weld, provide material for forming the weld bead and assist in isolating the extreme heat of the welding process to the weldment. This helps to reduce the possibility of thermally induced deformation in the joint. Furthermore, the uniform compression further inhibits thermal deformation. Since the conjoined faces of the joint are finished for mating engagement, only a minimum area leak path is presented to the interior of the pipe. Because the potential leak path area is minimized, and because the ridge to which the seal weld is applied is substantially isolated and relieved of any loading throughout the assembly procedure, the seal weld may be of relatively slight penetration. Thus, as is characteristic of seal welds, a weld of relatively small penetration can withstand substantial internal pressure.

A seal weld of small penetration is further desirable for several other reasons. First, it would leave the interior of the joint virtually undisturbed. Therefore, the interior of a pipe may more easily be provided with a suitable corrosive resistant coating. Moreover, a seal weld of only small penetration is more readily trimmed and dressed for servicing.

The step whereby the interior of the pipe joint is evacuated to provide uniform compression has several particular advantages. For example, automatic welding apparatus may more readily be attached to the area of the joint because there are normally no attachments to the area of the joint which might interfere with or clutter the joint. Support of the pipe, for example, may be provided on either side of the joint away from the location of the seal weld. Furthermore, without clutter about the joint, a continuous, uninterrupted weld bead may be more readily laid around the circumference of the joint. A continuous weld bead is more likely to be uniformly strong and sound and is less subject to breakdown due to thermal expansion.

A number of welding processes are suitable for providing the seal weld according to the invention. Electric arc welding processes may be suitable, for example. Preferably, however, the seal weld may be applied by the Tungsten Inert Gas (TIG) process utilizing automatic equipment. Likewise, weldment may be deposited in the weld, or no weldment used. In the latter case, the ambient metal of the ridge would "fuse" upon the pass of a welding tool.

The mechanical strength of the joint is derived from the collet 48 compressing the skirts 16 and 28. The strength of the joint is enhanced by the uniform axial and radial inwardly directed pressure which secures the collet 48 to the skirts 16 and 28. Furthermore, where the interior of the pipe carries fluids of above ambient temperature, the resultant thermal expansion of the pipe interior will cause the joint to expand still further. When the joint thermally expands, axial or end pressure compression of the joined skirts together occurs. Thus, this joint will be stronger than joints of the prior art of comparable dimension which utilize a greater number of axially aligned clamping bolts. Moreover, the use of tangentially disposed clamping bolts 56 minimizes non-uniformities in the tension between segments. It is not necessary to use a torque wrench to assure uniform tightening of the collet. This feature, combined with the typical embodiment utilizing only three clamping bolts, permits the relatively quick assembly of the joint according to this invention.

Referring to FIGS. 11 and 12, an apparatus for the installation of the joint of this invention using a welding pantograph is disclosed. Pipe segments 12 and 14 are shown with skirts 16 and 28 abutted. Pipe segment 12 has fastened around its periphery a jig 100 consisting of three segments 100a, 100b and 100c. Likewise, pipe segment 14 has fastened around its periphery a jig 102 consisting of three segments 102a, 102b and 102c.

Jig segments 100a, 100b and 100c are frictionally fastened to the exterior wall of the pipe 12 by tangentially extending bolts 104. As here shown, three such bolts are used. One bolt tangentially compresses segments 100a and 100b. Another bolt, not shown in FIG. 11, tangentially compresses segments 100b and 100c. A third bolt, shown in both FIGS. 11 and 12, compresses segments 100a and 100c. Thus, the jig firmly and frictionally grasps the pipe segment 12.

Construction of the jig 102 on pipe segment 14 is analogous. Radially extending bolts 106 clamp the respective segments 102a, 102b and 102c into firm frictional engagement with pipe segment 14 proximate frustroconical skirt 28.

As can be seen, each jig extends approximately over 120° of the outside radial surface of the pipe segments. At the end of each jig segment, there extends upwardly spoke 108 (see FIG. 12). Referring to FIG. 12, one such spoke 108 is shown to extend upwardly to define a bolt aperture 110. Similarly, from segment 102c, spoke 109 extends upwardly to define a bolt aperture 111. Spokes are similarly located on all segments 100a, 100b, 100c, 102a, 102b and 102c.

Bolt apertures 110 and 111 have passed through them bolts 114 having a nut 115. It can be seen that when each bolt 114 is tightened with respect to the spokes 108 and 109, end pressure will be applied through the jigs 100 and 102 to apply the necessary uniform pressure to the frustroconical skirts 16 and 28.

Remembering that pipe segments 12 and 14 are welded and remembering that each jig segment has a spoke and tightening bolt assembly at its ends, it will be seen that the jigs 100 and 102 have six bolts applying end pressure. The abutted skirts 16 and 28 combine at their ridges 26 and 38 (see FIGS. 1 and 12) to form a combined recessed ridge 40.

The spokes serve a dual function. Besides supplying the necessary end pressure, they support a track 124 on spokes 108, and track 125 on spokes 109 for supporting a traveling welding pantograph 120, which welding pantograph is a standard item of manufacture. The pantograph is placed within tracks 124 and 125 and makes at least one 360° pass depositing weldment for the seal weld 46.

Once the seal weld has been deposited completely about the joint, the pantograph is removed. The jigs 100 and 102 with their compressing bolts, however, remain firmly in place.

With the pantograph removed, the collet segments 48 (shown in broken lines in FIG. 12) are bolted in place as heretofore described. This bolting occurs within the spatial interval defined between the opposed jigs 100 and 102. Thus, the collet segments, when circumferentially clamped to the skirts 16 and 28 of the pipe segments 12 and 14, apply end pressure to the pipe joint. This end pressure supplants the end pressure of the jigs 100 and 102.

With the collet 48 firmly in place, the jig is finally removed.

It should be noted that the apparatus herein disclosed does not require the drawing of a vacuum interior of the abutted pipe segments. It should be understood, however, that a vacuum can be used.

Moreover, it can be easily seen by those skilled in the art that the pantograph could contain a cutting wheel. With the sequence of installing the jigs, removing the collet, and peripherally passing the pantograph and cutting wheel, disassemblying the joint can easily occur. Likewise, it will be seen that other modifications can be made.

A pipe joint has been described utilizing a relatively small seal weld and a circumferentially clamped collet. The joint has improved strength as a result of a reduced area for a leak path and the uniform axial and radial compression provided by the collet.

A process for assembly and disassembly of a clamped seal welded pipe joint has been described. The process includes the maintaining of a uniform axial compression on the pipe joint during assembly. In the preferred embodiment, the process also includes a step whereby the integrity of the seal weld may be readily tested.

In addition, apparatus for assembly and servicing of the pipe joint have been described. The apparatus promotes rapid assembly and disassembly of the joint.

The invention has been described with reference to particular embodiments. Other embodiments and variations will be apparent to those of skill in the art. It is not intended that the invention be limited.

I claim:

1. A pipe joint comprising: first and second pipe segments having male frustoconical skirts extending outwardly around the periphery of confronting portions of said pipe segments; said frustoconical skirts having mutually opposed machined and mated surfaces; said frustoconical skirts when mated defining angularly inclined sidewalls sloping from a broad cross section radially adjacent said pipe segments to a narrow cross section radially remote from said pipe segments; said skirts uniformly compressed towards each other such that said mated surfaces are in intimate contact; each of said skirts having an annular groove adjacent confronting portions of said periphery, thereby defining a mating ridge for receiving a seal weld; a seal weld sealably fusing said first and second pipe segments along said mating ridge defined by said uniformly compressed skirts; and a collet having a plurality of circumscribing segments extending around said skirts with a female frustoconical channel mating said male frustoconical skirts, said female frustoconical channel defining two opposed angularly inclined sidewalls sloping from defining a broad cross section of said channel radially adjacent said pipe segments to a narrow cross section radially remote from said pipe segments, said collet including means for circumferentially compressing said collet onto said juxtaposed skirts, thereby axially compressing said first and second pipe segments, for providing the mechanical strength of said pipe joint and for maintaining each of said skirts uniformly compressed with said seal weld extending across said ridge.

2. A pipe joint according to claim 1 wherein said means for compressing said collet onto said skirts includes between said collet segments bolt means and tangentially disposed lug means in said collet segments tangentially aligned with respect to said seal weld operative to provide uniform axial compression to said joint by wedging said juxtaposed skirts one towards the other.

* * * * *